United States Patent Office 2,886,573
Patented May 12, 1959

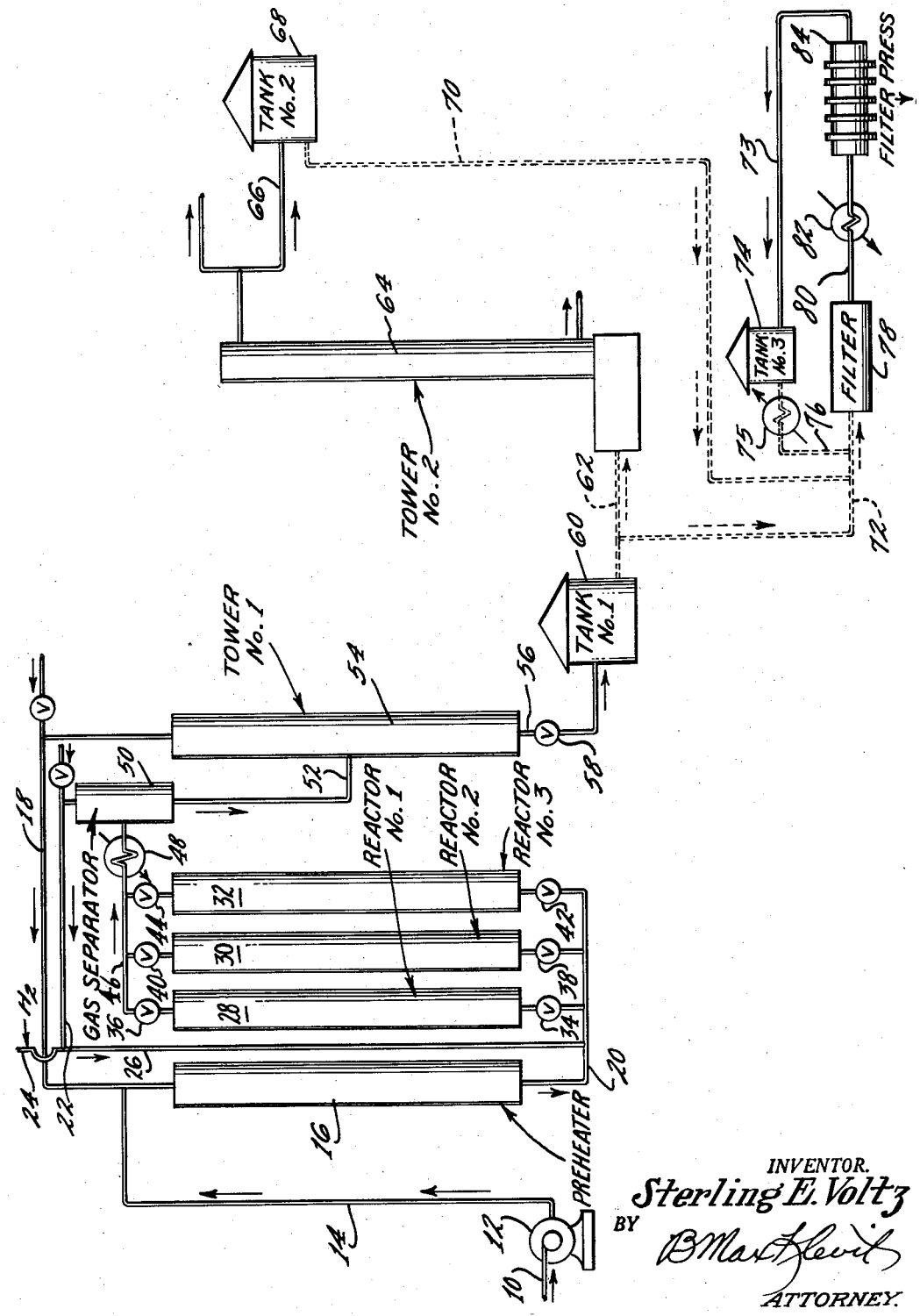

2,886,573

PROCESS FOR DEHYDROCYCLIZING HETERO-CYCLIC ORGANIC COMPOUNDS

Sterling E. Voltz, Chester, Pa., assignor to Houdry Process Corporation, Wilmington, Del., a corporation of Delaware Application April 13, 1956, Serial No. 578,099

14 Claims. (Cl. 260—319)

The present invention relates to the dehydrocyclizing of ortho substituted alkaryl compounds, and in particular to the preparation of heterocyclic organic nitrogen compounds, and is more specifically directed to a novel process for the preparation of indole from ortho ethyl aniline.

Indole has heretofore been prepared by the pyrogenic decomposition of various substances, particularly naturally-occurring nitrogenous materials, such as certain albumins. Indole has likewise been obtained indirectly from compounds such as isatin. Indole has also been derived from the coal tar fraction having a boiling point range of 240° C. to 260° C.

More recently, the preparation of indole from ortho ethyl aniline through contact with various catalytic dehydrogenation catalysts, such as metals and metal oxides, has been suggested. While some degree of success has been attained by catalytic methods, there are certain drawbacks. Thus, prior catalytic methods require greatly elevated temperatures, such as temperatures within the range 550° C. to 750° C., and preferably temperatures within the range 625° C. to 675° C. Due to such greatly elevated temperatures large quantities of polyindole and tars are formed.

An object of the present invention is to provide a method for the dehydrocyclization of ortho alkyl phenols, thiophenols, anilines, and other benzenoid compounds containing an alkyl group which is ortho to a group having a non-metallic atom in the side chain of the benzene ring, which atom is directly bonded to one of the carbons of the benzene ring, and which is other than a carbon or a hydrogen atom.

Another object of this invention is to provide a method for the dehydrocyclization of ortho alkyl anilines to produce indole derivatives.

A further object of this invention is to provide an improved method for the synthesis of indole.

A still further object of the present invention is the provision of a catalytic synthetic method for making indole in which relatively low temperatures are employed.

Another object of the present invention is the provision of a catalytic method for synthesizing indole from ortho ethyl aniline in which relatively high yields of indole are secured, and in which appreciable amounts of polyindole and tars and other undesirable by-products are avoided.

A further object of the present invention is the provision of a catalytic method for synthesizing indole in the presence of hydrogen, and in which appreciable amounts of polyindole and tars and other undesirable by-products are avoided.

These and other objects are accomplished in accordance with the present invention in which an ortho alkyl aromatic compound of the type in which the alkyl group is ortho to a group having a non-metallic atom bonded to the benzene ring, which atom is other than carbon or hydrogen (and in particular, ortho alkyl phenols, such as phlorol, or ortho alkyl anilines, such as ortho ethyl aniline), is contacted with a catalyst comprising cobalt molybdate, preferably cobalt molybdate impregnated on alumina, in the presence of hydrogen at a temperature of between about 400° C. and 500 C., preferably at a temperature of about 460° C. to 500° C. The relative molar ratio of hydrogen to the organic ortho alkyl compound should be more than unity, such as a ratio of 3:1, and most preferably about 9:1. Ratios of up to 20:1 or more mols of hydrogen per mol of organic compound may be utilized.

The process of the present invention is very sensitive to the liquid space rate. A liquid hourly space velocity of from 0.5 to 2.0 volumes of liquid per volume of catalyst per hour may be used, with a space rate of about 1.0 being preferred at the optimum temperature range.

The pressure at which the process of the present invention should be conducted may be varied over a wide range, and for reasons of convenience is preferably conducted at atmospheric pressure.

Increasing the liquid space rate at conversion conditions results in a much higher yield of total liquid product (such as in the case of the dehydrocyclization of ortho ethyl aniline, a liquid product containing indole, unreacted ortho ethyl aniline, and trace amounts of aniline), but a much smaller weight percent of indole in such liquid product.

It has been found that raising the temperature within the limits in which the process of the present invention should be conducted results in a higher percentage of the desired product compound in the liquid product, but also in a higher deposition of coke.

It has been found that the process of the present invention employing a supported cobalt molybdate catalyst in which the cobalt molybdate is in the form of a true molecular compound, and is not a mixture of cobalt oxide and molybdenum oxide, may be operated at relatively low temperatures to produce relatively high yields, and for extended periods of time, since cobalt molybdate catalyst possesses a high degree of stability at the process operating conditions. Moreover, the cobalt molybdate catalyst may be successfully regenerated after extended on-stream use, and may then be re-used in this process.

A variety of means may be used to prepare the supported cobalt molybdate catalyst used in the process of the present invention. A preferred method by which such catalyst may be prepared is as follows:

An aqueous solution of a soluble cobalt salt, such as cobalt nitrate, and an ammoniacal solution of a soluble molybdate, such as ammonium molybdate are mixed in the presence of a stabilized alumina base to produce hydrated cobalt molybdate impregnated on alumina. Drying the impregnated base and calcining at a temperature in excess of 445° C. removed the water of hydration from the cobalt molybdate.

A preferred catalyst embodiment consisted of 10 weight percent of cobalt molybdate on alumina of high porosity, such as 233 square meters per gram. However, the concentration of cobalt molybdate is not critical and its weight percentage in respect to the alumina may be varied over a wide range.

As above-indicated, the catalyst of the present invention comprises true molecular cobalt molybdate. Thus, X-ray analysis should fail to detect the presence of elemental cobalt, molybdenum, or free oxides of these elements.

While alumina is the preferred support or carrier for the catalysts of the present invention, other supports and carriers having high porosities and good physical properties may be utilized.

The process of the present invention will be illustrated by the preparation of indole from ortho ethyl aniline. It is to be understood, however, that the process of the present invention may be practiced on compounds other than ortho ethyl aniline to produce compounds other than indole. Thus, ortho alkyl aromatic compounds may be used as charge and which compounds are characterized as

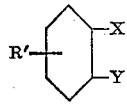

where "X" is a functional group containing a non-metallic atom bonded to the benzene ring selected from the group consisting of nitrogen, sulfur and oxygen, e.g., $-NH_2$, $-NHR$, $-NR_2$, $-SH$, $-SR$, $-OH$, $-OR$, where R is a hydrocarbon radical selected from acyclic and cyclic groups up to eight carbon atoms; where "Y" is an adjacent (ortho) alkyl group having up to eight carbon atoms, and having at least one methyl ($-CH_3$) group, or having a methylene ($>CH_2$) group in a position "delta" to the group "X" to permit the formation of a hetero-cyclic nucleus by ring closure between Y and X; and where R' is hydrogen or a hydrocarbon radical selected from acyclic and cyclic groups up to eight carbon atoms. Illustrative compounds which may be used in the subject invention include o-alkyl phenols such as phlorol (o-ethyl phenol) and thymol; o-isopropyl thiophenol, o-alkyl thiophenols, o-ethyl aniline, o-alkyl anilines, N-methyl-o-toluidine, N-alkyl o-alkyl anilines. The aromatic nucleus may be mono- or poly-nuclear. For example, ortho alkyl anilines may be utilized in the process of the present invention to produce other heterocyclic nitrogen compounds. 7-ethyl-indole may be produced from ortho diethyl aniline (2-6 diethyl aniline) in accordance with the process of the present invention. Similarly, methyl indoles may be produced from ortho isopropyl aniline, and 2-ethyl indole from N-methyl ortho toluidine. The process of the present invention is applicable to phenolic compounds. Thus, benzofuran may be produced in accordance with the process of the present invention from phlorol.

The accompanying drawing illustrates a simplified and schematic flow sheet of a preferred embodiment of the subject invention, wherein the conversion of ortho ethyl aniline to indole is effected, it being understood however, that this invention is not limited to the precise arrangement shown therein.

Referring to the accompanying drawing, ortho ethyl aniline is introduced into the system through line 10 and is passed through pump 12 to line 14 wherein it is joined by liquid recycle from line 18.

This combined mixture is conveyed from line 14 through preheater 16 wherein it is heated to a temperature within the reaction temperature range of 400° C. to 500° C., preferably about 460° C.–500° C.

The heated mixture is then passed to line 20, wherein it is joined by gas from line 26. Such gas comprises: recycle gas from line 22, which consists predominantly of hydrogen with minor amounts of ammonia and low molecular weight hydrocarbons; and fresh hydrogen from line 24.

The reactants are transferred from line 20 to reactors 28, 30 and 32 at a space rate of 0.5 to 2.0 volumes of liquid per volume of catalyst per hour, and preferably about 1.0 volumes of liquid per volume of catalyst per hour.

The volume of total gas to total vaporized hydrocarbon liquid charged to reactors 28, 30 and 32 should be maintained at a volume ratio of 3:1 to 20:1, and preferably at a volume ratio at about 9:1.

For a four hour on-stream period (it is, of course, to be understood that longer on-stream periods may be used, and that the four-hour period referred to in this example is but illustrative of one embodiment of the present invention), using a cobalt molybdate on alumina catalyst, an average yield of indole during each of the four hours of greater than 50 weight percent in the liquid product was obtained at atmospheric pressure, a mol ratio of hydrogen to ortho ethyl aniline of 9:1, a temperature of 460° C., and a space rate of 0.5 volumes of liquid per volume of catalyst per hour. The total amount of coke on the catalyst at the conclusion of the four hour on-stream run was 9.5 weight percent, without regeneration.

In the illustrative embodiment, the combined feed in line 20 is preferably directed to two of the three reactors 28, 30 and 32, the third reactor being in the regeneration stage while the other two reactors are on-stream. However, it is, of course, to be understood that other on-stream arrangements may be effected, and a larger or smaller number of reactors may be utilized.

It is desirable to maintain the coke content below a predetermined level, such as below three weight percent based on the catalyst. This can be accomplished by the above-described three reactor system, in which two reactors are on-stream, and the third reactor is in the regeneration stage. Thus, shunting of the feed through any two of the reactors 28, 30 and 32 can be accomplished through respective valve pairs 34 and 36 for reactor 28, valve pairs 38 and 40 for reactor 30, and valve pairs 42 and 44 for reactor 32.

The regeneration of the catalyst of the present invention within reactors 28, 30 and 32 may be effected by conventional oxidative coke removal procedures, as would include oxidation, purging and reduction steps. Such procedures are well known to the art, and for this reason will not be described herein. Similarly, for simplicity, the necessary line and valve arrangements to effect such regeneration are not shown in the accompanying flow sheet.

The effluent from the on-stream reactors is removed through line 46 and passed through condenser 48, wherein such effluent is cooled to a temperature at which condensation of the liquid constituents thereof is effected.

From condenser 48 the effluent in line 46 is passed to gas separator 50. In gas separator 50 the condensed liquid is separated from the gas, and the separated gas is recycled to the on-stream reactors through line 22. As heretofore indicated, the recycled gas from gas separator 50 comprises predominantly hydrogen with relatively small amounts of low molecular weight hydrocarbons and ammonia. The gaseous hydrocarbons and ammonia are present in unit 28 due to decomposition and deamination of the ortho ethyl aniline during the reaction, and/or preheating stages.

While the ammonia may be scrubbed out of the recycled gas by contact with water, its presence in minor amounts apparently is not detrimental to the catalyst and is desirable in improving the yield of indole in that the recycling of minor amounts of ammonia aids in the suppression of the deamination of the ortho ethyl aniline.

From gas separator 50 the condensed reaction product is passed through line 52 to fractionation column 54. In fractionation column 54 the unreacted ortho ethyl aniline is taken overhead through line 18 and recycled to the system as liquid recycle by being passed into preheater 16 along with the fresh ortho ethyl aniline from line 14, as heretofore mentioned. Trace amounts of ethylbenzene and aniline may also be removed overhead from fractionation column 54, or if desired, cuts rich in ethylbenzene and aniline may be removed separately.

From fractionation column 54 the indole containing bottoms are passed through line 56 and valve 58 to storage tank 60. The indole may be supplied to users directly from storage tank 60, as the indole bottoms from fractionation column 54 may have a purity of as high as about 95%.

However, if desired, the indole may be purified, as by a variety of optional procedures. Thus, the indole may be passed from storage tank 60 through line 62 to distillation tower 64. From distillation tower 64 the indole may be taken overhead in high purity and transferred through line 66 to storage tank 68.

The distilled indole in storage tank 68 may be withdrawn as such, or may be further purified as by recrystallization in the following manner:

Indole from storage tank 68 may be passed from line 70 into line 72. In line 72 the indole from storage tank 68 may be joined with a suitable solvent or mother liquid from tank 74 and line 76. Examples of such solvents include water; or a mixed solvent of water and an organic material such as methanol; or an organic solvent such as isohexane.

The ratio of solvent to indole is such as to cause the indole to be dissolved within the solvent. The solution of dissolved indole and solvent is passed through filter 78 which may contain a filter bed of a suitable adsorbent, such as activated charcoal, alumina, basic clays, or other adsorbents which remove undesirable impurities but do not promote the polymerization of indole.

The filtered and impurity-free solution is passed from filter 78 through line 80 and heat exchanger 82, wherein the temperature of the filtered solution is lowered to a point at which the indole precipitates therefrom. The slurry of precipitated indole and mother liquor is passed through filter press 84 wherein the precipitated indole is removed on filter cloths. The filtered indole may be washed, if desired, with water to remove occluded mother liquor.

The mother liquor from filter press 84 may be recycled as through line 73, storage tank 74, and heat-exchanger 75 to line 76. Such mother liquor may be processed to recover solvent and additional indole as by distilling and cooling, and the like. The crude indole recovered from the mother liquor may, if desired, be reprocessed through reactors 28, 30 and 32 to accelerate the production of indole and suppress the formation of polyindoles.

Illustrative examples of various embodiments of the process of the present invention are set forth below:

*Example I*

Ortho ethyl aniline was contacted with cobalt molybdate on alumina catalyst at a temperature of 400° C., atmospheric pressure, a liquid hourly space velocity of 1.0 volumes of liquid per volume of catalyst per hour, and a molar ratio of hydrogen to ortho ethyl aniline of 9 to 1.

The catalyst was reduced with hydrogen at the on-stream operating temperature for one hour prior to being placed on-stream.

A four hour on-stream period was employed and the weight percent of indole in the liquid product during each of the four hours was ascertained.[1] The total liquid product weight percent was determined, and the weight percent of hydrogen produced during the total on-stream period was determined from the difference in input and output flow rates with suitable correction for small amounts of light hydrocarbons formed during the reaction. The weight percent of coke was also determined at the close of the four hour on-stream period.

Under the operating conditions set forth in this example, the weight percent of indole in the liquid product during each of the four consecutive one-hour on-stream periods was as follows: 5 weight percent in the first hour; 7.5 weight percent in the second hour; 7 weight percent in the third hour; and 6.5 weight percent in the fourth hour. The total liquid product constituted 95.8 weight percent based on the ortho ethyl aniline, the amount of hydrogen plus traces of gaseous hydrocarbons produced was 1.2 weight percent and the weight percent of coke was 1.9 weight percent.

*Example II*

Ortho ethyl aniline was contacted with cobalt molybdate catalyst similar to that utilized in Example I at a temperature of 460° C., atmospheric pressure, a liquid hourly space velocity of 1.0 volumes of liquid per volume of catalyst per hour, and a molar ratio of hydrogen to ortho ethyl aniline of 9 to 1.

The catalyst was reduced with hydrogen at the on-stream operating temperature for one hour prior to being placed on-stream.

A four hour on-stream period was employed and the weight percent of indole in the liquid product during each of the four hours, the total liquid product weight percent and the weight percent of hydrogen produced during the total on-stream period, were determined as in Example I.

Under the operating conditions set forth in this example, the weight percent of indole during each of the four consecutive one-hour on-stream periods was as follows: 32 weight percent in the first hour; 33 weight percent in the second hour; 28.5 weight percent in the third hour; and 27.5 weight percent in the fourth hour. The total liquid product constituted 91.3 weight percent based on the ortho ethyl aniline, the amount of hydrogen and gaseous hydrocarbons produced was 2.8 weight percent, and the amount of coke was 1.2 weight percent.

*Example III*

Ortho ethyl aniline was contacted with cobalt molybdate catalyst similar to that utilized in Example I at a temperature of 500° C., atmospheric pressure, a liquid hourly space velocity of 1.0 volumes of liquid per volume of catalyst per hour, and a molar ratio of hydrogen to ortho ethyl aniline of 9 to 1.

The catalyst was reduced with hydrogen at the on-stream operating temperature for one hour prior to being placed on-stream.

A four hour on-stream period was employed and the weight percent of indole in the liquid product during each of the four hours, the total liquid product weight percent, the weight percent of hydrogen produced during the total on-stream period, and the weight percent of coke were determined as in Example I.

Under the operating conditions set forth in this example, the weight percent of indole during each of the four consecutive one-hour on-stream periods was as follows: 60 weight percent in the first hour; 56 weight percent in the second hour; 48 weight percent in the third hour; and 27.5 weight percent in the fourth hour. The total liquid product constituted 89.7 weight percent based on the ortho ethyl aniline, the amount of hydrogen and gaseous hydrocarbons produced was 5.5 weight percent and the weight percent of coke was 3.9 weight percent.

*Example IV*

Ortho ethyl aniline was contacted with cobalt molybdate catalyst similar to that utilized in Example I at a temperature of 460° C., atmospheric pressure, a liquid hourly space velocity of 0.5 volumes of liquid per volume of catalyst per hour, and a molar ratio of hydrogen to ortho ethyl aniline of 9 to 1.

The catalyst was reduced with hydrogen at the on-stream operating temperature for one hour prior to being placed on-stream.

A four hour on-stream period was employed and the weight percent of indole in the liquid product during each of the four hours, the total liquid product weight percent, the weight percent of hydrogen produced during the total on-stream period, and the weight percent of coke were determined as in Example I.

---

[1] The weight percent indole in the liquid product was determined by refractive indices and infrared analyses; and in some instances by distillation and analysis.

Under the operating conditions set forth in this example, the weight percent of indole during each of the four consecutive one-hour on-stream periods was as follows: 50 weight percent in the first hour; 55 weight percent in the second hour; 55 weight percent in the third hour; and 50 weight percent in the fourth hour. The total liquid product constituted 86.8 weight percent based on the ortho ethyl aniline, the amount of hydrogen and gaseous hydrocarbons produced was 6.3 weight percent and the weight percent of coke was 5.5 weight percent.

*Example V*

Ortho ethyl aniline was contacted with cobalt molybdate catalyst similar to that utilized in Example I at a temperature of 460° C., atmospheric pressure, a liquid hourly space velocity of 2.0 volumes of liquid per volume of catalyst per hour, and a molar ratio of hydrogen to ortho ethyl aniline of 9 to 1.

The catalyst was reduced with hydrogen at the on-stream operating temperature for one hour prior to being placed on-stream.

A four hour on-stream period was employed and the weight percent of indole in the liquid product during each of the four hours, the total liquid product weight percent, the weight percent of hydrogen produced during the total on-stream period, and the weight percent of coke were determined as in Example I.

Under the operating conditions set forth in this example, the weight percent of indole during each of the four consecutive one-hour on-stream periods was as follows: 25 weight percent in the first hour; 21.5 weight percent in the second hour; 18 weight percent in the third hour; and 16 weight percent in the fourth hour. The total liquid product constituted 94.5 weight percent based on the ortho ethyl aniline, the amount of hydrogen and gaseous hydrocarbons produced was 1.3 weight percent and the weight percent of coke was 1.5 weight percent.

*Example VI*

An unsupported cobalt molybdate catalyst was prepared by first effecting precipitation with stoichiometric amounts of cobalt nitrate and ammonium molybdate in an ammoniacal solution. After drying this precipitate at 110° C., by analysis its composition was found to be $CoMoO_4 \cdot H_2O$.

The precipitate was then calcined in an oxidizing atmosphere (although an inert or reducing atmosphere would serve as well) to eliminate the water of hydration, yielding $CoMoO_4$. Treatment of this material with hydrogen at 460° C. for 1 hour reduced the compound to $CoMoO_3$, the catalyst of the present invention. The surface area of the unsupported cobalt molybdate was 12 square meters per gram. X-ray spectra failed to detect any elemental cobalt or molybdenum or oxides of these elements; whereas the usual cobalt molybdates, $CoMoO_4$ and $CoMoO_3$, obtained on reduction gave distinct X-ray patterns for the specific compounds.

The following table presents the X-ray diffraction data on the catalyst of Example VI, giving the three principal $d/n$ values [2] and tabulating, for comparison purposes the three principal $d/n$ values for the elements cobalt and molybdenum and their oxides.

The $d/n$ values are sensitive characterization factors for the specific compounds. The three principal values for each compound are given in decreasing order of intensity. In the X-ray pattern for cobalt molybdate there is no X-ray evidence of cobalt or its oxides, nor molybdenum and its oxides in terms of $d/n$ values reported in the ASTM "Index of X-ray Diffraction Data." ASTM tech. Publication #48B (1950).

[2] $d/n = \frac{\text{interplanar distance}}{\text{order}}$ (Angstrom)

| Substance | Interplanar Spacing Values $d/n$ (Angstrom) | | |
|---|---|---|---|
| Cobalt Molybdate ($CoMoO_4$) (Oxidized) | 6.27 | 3.36 | 3.12 |
| Cobalt Molybdate ($CoMoO_3$) (Reduced) | 5.00 | 3.52 | 2.51 |
| Co | 2.04 | 1.92 | 1.07 |
| CoO | 2.12 | 1.50 | 2.45 |
| $Co_2O_3$ | 2.87 | 2.33 | 1.78 |
| $Co_3O_4$ | 2.43 | 1.43 | 1.56 |
| Mo | 2.22 | 1.28 | 0.84 |
| $Mo_2O_3$ | 3.42 | 2.42 | 1.71 |
| $MoO_2$ | 3.42 | 2.42 | 1.71 |
| $MoO_3$ | 3.25 | 3.80 | 3.46 |

(ASTM)

A mixture of the individual compounds show the X-ray diffraction pattern of each compound and not an intermediate or average value. On this basis, the cobalt molybdate used in Example VI is distinct.

Ortho ethyl aniline was contacted with the unsupported cobalt molybdate at a temperature of 460° C., atmospheric pressure, a liquid hourly space velocity of 1.0 volumes of liquid per volume of catalyst per hour, and a molar ratio of hydrogen to ortho ethyl aniline of 9 to 1.

A four hour on-stream period was employed and the weight percent of indole in the liquid product during each of the four hours, the total liquid product weight percent and the weight percent of hydrogen produced during the total on-stream period, were determined as in Example I.

Under the operating conditions set forth in this example, the weight percent of indole during each of the four consecutive one-hour on-stream periods was as follows: 38 weight percent in the first hour, 29 weight percent in the second hour, 25 weight percent in the third hour, and 19 weight percent in the fourth hour. The total liquid product constituted 95.8 weight percent based on the ortho ethyl aniline, the amount of hydrogen and gaseous hydrocarbons produced was about 3–4 weight percent and the amount of coke produced was 0.7 weight percent.

It will be seen from the examples set forth above that the dehydrocyclization process of the present invention is very sensitive to the liquid space velocity, and that the temperature must be maintained within the limits set forth herein to secure optimum results. Thus, the catalyst had a relatively low activity at 400° C., and while it possessed a relatively high activity at 500° C., the amount of carbon deposited upon the catalyst was relatively high at this temperature.

The present invention may be embodied in other specific forms without departing from the spirit or essential attributes thereof and, accordingly, reference should be made to the appended claims, rather than to the foregoing specification as indicating the scope of the invention.

It is claimed:

1. The process for dehydrocyclizing an ortho alkyl aniline of the formula

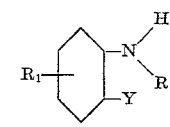

in which Y is an alkyl group having up to eight carbon atoms and selected from the group consisting of alkyl groups having a methyl group and alkyl groups having a methylene group delta to $-NH_2$, and in which R and $R_1$ are selected from the group consisting of hydrogen and hydrocarbon radicals having up to eight carbon atoms; by contact at a temperature of between 400° C. and 500° C. with a catalyst consisting essentially of supported cobalt molybdate, at a liquid hourly space velocity of 0.5 to 2 volumes of said alkyl aniline per volume of catalyst.

2. A process in accordance with claim 1 in which the catalyst consists essentially of cobalt molybdate impregnated on alumina.

3. A process in accordance with claim 1 in which the ortho alkyl aniline is ortho ethyl aniline.

4. A process in accordance with claim 1 in which the ortho alkyl aniline is ortho isopropyl aniline.

5. A process in accordance with claim 1 in which the ortho alkyl aniline is 2-6 diethyl aniline.

6. A process in accordance with claim 1 in which the ortho alkyl aniline is N-methyl ortho toluidine.

7. A process in accordance with claim 1 in which the ortho alkyl aniline is contacted with the catalyst in the presence of at least 3 moles of hydrogen per mol of said alkyl aniline.

8. A process in accordance with claim 1 in which the elevated temperature is a temperature of about 460° C. to 500° C.

9. A process for synthesizing indole which comprises contacting a mixture of hydrogen and ortho ethyl aniline at a temperature of between about 400° C. and 500° C. with a catalyst consisting essentially of cobalt molybdate impregnated upon alumina, at a liquid hourly space velocity of 0.5 to 2 volumes of said ortho ethyl aniline per volume of catalyst.

10. A process for synthesizing indole which comprises contacting a mixture of hydrogen and ortho ethyl aniline at a temperature of between about 460° C. to 500° C. with a catalyst consisting essentially of cobalt molybdate impregnated upon alumina.

11. A process for synthesizing indole which comprises contacting a mixture containing hydrogen and ortho ethyl aniline, with the molar ratio of hydrogen to ortho ethyl aniline being at least 3:1, with a dehydrogenation catalyst comprising cobalt molybdate at a temperature of between about 400° C. to 500° C., and a space rate of between about 0.5 to 2.0 volumes of liquid per volume of catalyst per hour.

12. A process for synthesizing indole which comprises contacting a mixture containing hydrogen and ortho ethyl aniline, with the molar ratio of hydrogen to ortho ethyl aniline being about 9 mols of hydrogen per mol of ortho ethyl aniline, with a dehydrogenation catalyst comprising cobalt molybdate at a temperature of between about 400° C. to 500° C., and a space rate of between about 0.5 to 2.0 volumes of liquid per volume of catalyst per hour.

13. A process for synthesizing indole which comprises contacting a mixture containing hydrogen and ortho ethyl aniline, with the molar ratio of hydrogen to ortho ethyl aniline being about 9 mols of hydrogen per mol of ortho ethyl aniline, with a dehydrogenation catalyst comprising cobalt molybdate at a temperature of between 460° C. to 500° C., and a space rate of between about 0.5 to 2.0 volumes of liquid per volume of catalyst per hour.

14. A process for synthesizing indole which comprises contacting a mixture containing hydrogen and ortho ethyl aniline in the ratio of about 9 mols of hydrogen per mol of ortho ethyl aniline at a temperature of about 460° C. to 500° C. and a space rate of about 1.0 volumes of liquid per volume of catalyst per hour with a catalyst consisting essentially of cobalt molybdate impregnated upon alumina.

References Cited in the file of this patent

UNITED STATES PATENTS

| | | |
|---|---|---|
| 2,409,676 | Gresham et al. | Oct. 22, 1946 |
| 2,643,266 | Teter | June 23, 1953 |

FOREIGN PATENTS

| | | |
|---|---|---|
| 640,965 | Great Britain | Aug. 2, 1950 |
| 690,806 | Great Britain | Apr. 29, 1953 |

UNITED STATES PATENT OFFICE
CERTIFICATE OF CORRECTION

Patent No. 2,886,573                          May 12, 1959

Sterling E. Voltz

It is hereby certified that error appears in the printed specification of the above numbered patent requiring correction and that the said Letters Patent should read as corrected below.

Column 3, line 39, for "2-ethyl indole from N-methyl" read -- 2-methyl indole from N-ethyl --.

Signed and sealed this 3rd day of November 1959.

(SEAL)
Attest:

KARL H. AXLINE                              ROBERT C. WATSON
Attesting Officer                           Commissioner of Patents